United States Patent [19]
Tyson

[11] Patent Number: 4,839,646
[45] Date of Patent: Jun. 13, 1989

[54] MOVEMENT PARAMETER SENSOR

[75] Inventor: Graham R. Tyson, Nunawading, Australia

[73] Assignee: Royal Melbourne Institute of Technology Limited, Melbourne, Australia

[21] Appl. No.: 18,192

[22] Filed: Feb. 24, 1987

[30] Foreign Application Priority Data

Feb. 28, 1986 [AU] Australia ............... PH4832

[51] Int. Cl.$^4$ ............................... G08C 19/00
[52] U.S. Cl. ............... 340/870.30; 324/160; 324/166
[58] Field of Search ........... 340/870.37, 870.3, 870.31, 340/870.38; 324/207, 208, 262, 61 R, 166, 160

[56] References Cited

U.S. PATENT DOCUMENTS

| 4,165,505 | 8/1979 | Cain et al. ............ 340/870.37 |
| 4,420,754 | 12/1983 | Andermo . |
| 4,433,332 | 2/1984 | Wason ............... 340/870.37 |

FOREIGN PATENT DOCUMENTS

| 3340782 | 5/1985 | Fed. Rep. of Germany . |
| 2118720 | 11/1983 | United Kingdom ........... 340/870.37 |

Primary Examiner—John W. Caldwell, Sr.
Assistant Examiner—Tyrone Queen
Attorney, Agent, or Firm—Ladas & Parry

[57] ABSTRACT

A movement parameter sensor for sensing of parameters of movement between a stator member defining a frame of reference and a rotor member movable relative to the stationary member about a rotation axis. The sensor includes field providing means for generating an electric field located at the stator member, the field providing means including a pole arrangement comprising an array of four source electrode means arranged adjacent to each other along a field line around the rotation axis. The field providing means includes an excitation signal generator for generating four equal frequency excitation signals at 90 degree increments of phase, each one of the four excitation signals being applied to a respective one of the four source electrode means such that a virtually moving electric field is created at the source electrode means so that the electric field effectively moves relative to the stator member along the field line. The sensor further includes a field sensor provided at the rotor member, the field sensor comprising sensor electrode means for sensing at any time a resultant electric field produced as a result of the excitation signals applied to more than one of the source electrode means, the field sensor being operable to generate an output indicative of the sensed resultant electric field whereby the output depends on relative angular position and speed between the stator member and the rotors member.

9 Claims, 4 Drawing Sheets

MOVEMENT PARAMETER SENSOR

This invention relates to sensing of parameters relating to relative position or movement between two members and particularly although not exclusively to sensing of relative angular position and relative angular velocity.

One field in which it is necessary to accurately sense and respond to relative speed between two relatively rotatable members is the automatic control of rotational speed in mechanical drives. For example there is a need for a precise speed sensor to enable tight automatic control of the translational speed in powered wheelchairs for disabled people. Another field is the precise automatic control of industrial drives.

Very few powered wheelchairs use feedback in any form and high grade d.c. tachogenerators are never used because of bulk, weight and cost. Various attempts are made in some of the better classes of these machines, to sense speed. Some use the back electromotive force of the drive motors samples by complex electronic switching, and others use various forms of impulse pickup. All of these systems have severe performance limitations near zero speed.

In a powered wheelchair the most critical requirement of the drive system is to be able to obtain a desired speed and bring the wheelchair cleanly to a stop when operating at any angle up or down steep slopes, e.g. of the order of 1 in 3 or steeper. In order to do this well it is necessary to have a speed sensor which is continuous through zero speed, and this precludes the use of impulse counting sensors in high performance drives. The problems in a child's wheelchair are compounded by limited space and payload capacity. Cost is also a serious consideration since the better class of machines are not normally supplied with government funding assistance, even though such a machine may be necessary because of the nature of the child's disability.

It is an object of the present invention to provide a movement parameter sensor which can precisely indicate movement parameters throughout a desired range.

It is an object of one aspect of the present invention to provide a sensor which can very precisely indicate relative speed of two relatively movable members even at relative speeds at or very close to zero.

It is a further preferred object to provide a sensor which can be manufactured relatively inexpensively and which is relatively compact, robust and tolerant of mechanical variables in installation and operation.

According to a first aspect of the present invention there is provided a movement parameter sensor for sensing of parameters of movement between a stationary member defining a frame of reference and a movable member movable relative to the stationary member along a movement line, the sensor including field providing means for generating an electric field located at the stationary member, the field providing means including a pole arrangement comprising an array of four source electrode means arranged adjacent to each other along a field line generally coincident with the movement line the field providing means further including an excitation signal generating means for generating four equal frequency excitation signals at 90 degree increments of phase, each one of the four excitation signals being applied to a respective one of the four source electrode means such that a virtually moving electric field is created at the source electrode means whereby the electric field effectively moves relative to the stationary member along the field line, the movement parameter sensor further including field sensing means provided at the movable member, the field sensing means comprising sensor electrode means for sensing at any time a resultant electric field produced as a result of the excitation signals applied to more than one of the source electrode means, the field sensing means being operable to generate an output indicative of the sensed resultant electric field whereby the output depends on parameters of relative movement between the stationary member and the movable member.

For determining relative angular position between a movable member which is rotatable relative to the the stationary member about a rotation axis, each of the four source electrode means preferable comprises a single planar source electrode, the four planar source electrodes being arranged around the rotation axis and each source electrode subtending substantially 90 degrees of arc relative to the rotation axis but being electrically insulated from each adjacent source electrode, the sensor electrode means comprising a planar sensor electrode subtending an arc of greater than 90 degrees relative to the rotation axis so as to thereby always overlap at least two source electrodes, whereby the phase of the resultant electric field sensed by the sensor electrode relative to any one of the excitation signals shift by 360 degrees for one complete revolution of the movable member relative to the stationary member, and whereby the phase at any time uniquely relates to the relative angular position of the movable member about said rotation axis. Preferably the sensor electrode subtends an arc of substantially 180 degrees at the rotation axis so as to fully overlap two or partially overlap three source electrodes at all times, the sensor electrode increasing in width in the radial direction to a maximum substantially midway along its length in the circumferential direction.

According to a second aspect of the present invention there is provided a movement parameter sensor for sensing the velocity of relative movement between a stationary member defining a frame of reference and a movable member movable relative to the stationary member along a movement line, the movement parameter sensor comprising field providing means for generating an electric field located at the stationary member, the field providing means including a pole arrangement comprising a plurality of source electrode means, each source electrode means comprising a plurality of electrically connected source electrodes arranged along a field line generally coincident with the movement line, the source electrodes being adjacent to each other and being arranged in a repeating sequence such that each source electrode is adjacent to one of the source electrodes of a different one of the source electrode means, the field providing means further including an excitation signal generating means for generating a number of equal frequency excitation signals at increments of phase, each one of the excitation signals being applied to a respective one of the source electrode means such that a virtually moving electric field is created at the source electrode means with the field effectively moving relative to the stationary member along the field line, the movement parameter sensor further including field sensing means provided at the movable member, the field sensing means comprising sensor electrode means for sensing at any time a resultant electric field produced as a result of the excitation signals applied to more than one of the source electrode means and for generating an output indicative of the sensed resultant electric field whereby the frequency of the output relative to the frequency of any one of the excitation signals depends on the relative velocity between the stationary and movable members.

As in the first aspect, preferably in the movement parameter sensor of the second aspect the pole arrangement comprises an array of four of the source electrode means, the excitation signal generating means being operable to generate four equal frequency excitation signals at 90 degree increments of phase, each one of the four excitation signals being applied to a respective one of the four source electrode means to produce the virtually moving electric field. Preferably in the sensor of the first aspect or in the preferred sensor of the second aspect the four equal frequency excitation signals are sinusoidal signals of equal amplitude, the source electrode means being arranged closely adjacent to each other so that the resultant electric field sensed at any time by the sensor electrode means is generally sinusoidal and of substantially constant peak amplitude. Where the movable member is rotatable relative to the stationary member about a rotation axis and each source electrode means comprises a plurality of source electrodes, the source electrodes preferably are all substantially identical and are symmetrically arranged around the rotation axis, the number of source electrodes being a multiple of four and every fourth source electrode around the rotation axis being electrically connected to receive a respective one of the four excitation signals. Preferably the sensor electrode means comprises a plurality of electrically interconnected sensor electrodes, the sensor electrodes being arranged symmetrically around the rotation axis at equal angles to the rotation axis, the number of sensor electrodes being equal to the number of source electrodes in each of the four source electrode means. Each sensor electrode preferably has a length in the direction generally tangential to the direction of rotation substantially equal to the tangential length of two adjacent source electrodes so as to fully overlap two or partially overlap three source electrodes at all times, each sensor electrode increasing in radial width to a maximum midway along its length.

In the particular environment for which the present invention has been developed where a sensor is for use with apparatus having a rotatable member mounted on a shaft so as to be rotatable therewith (such as an electric motor). The stationary member may comprise a stator member fixed relative to the frame or the like of the apparatus with the field generated at the stator member rotating around the rotary shaft and the movable member may comprise a rotor member mounted to the shaft so as to be rotatable therewith. However it is possible for the stator member to be mounted on the rotating shaft and the rotor member to be fixed relative to the apparatus frame since it is relative angular movement between the stator and rotor members that is sensed.

Possible and preferred features of the present invention will now be described with particular reference to the accompanying drawings. However it is to be understood that the features illustrated in and described with reference to the drawings are not to be construed as limiting on the scope of the invention. In the drawings.

Figures 1, 3:
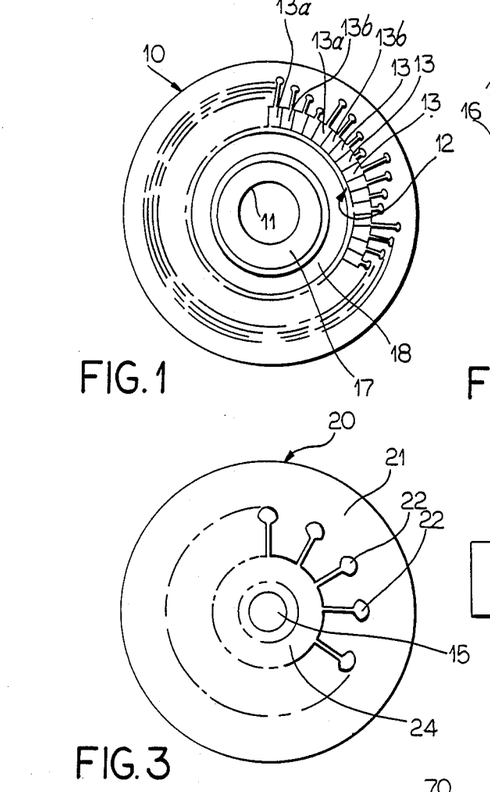
FIG. 1 is a front view of a stator member of a relative angular speed sensor suitable for use with apparatus having a rotatable member mounted on a shaft.
FIG. 3 is a front view of the rotor member for mounting for rotation with the shaft of the apparatus and for sensing the field at the stator member.
Figures 2, 4:
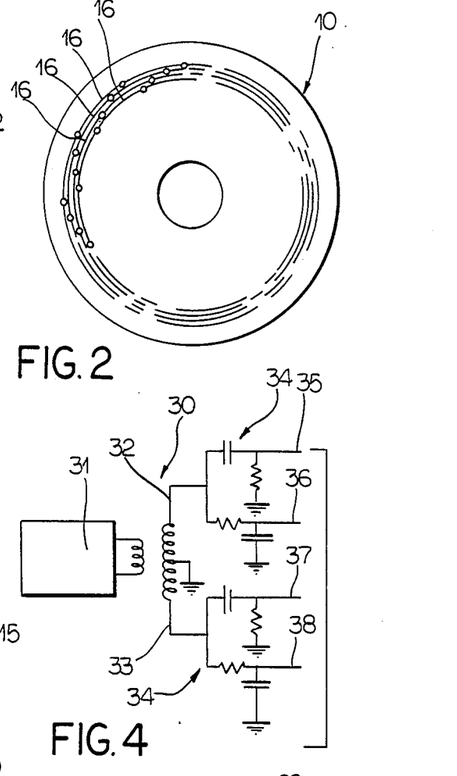
FIG. 2 is a back view of the stator member in FIG. 1 showing the interconnections between electrodes.
FIG. 4 is a circuit diagram for an excitation signal generating means.

Referring now to FIGS. 1 to 3, the stationary member or the stator 10 is, in use, mounted to the apparatus frame so as to be fixed relative thereto, the shaft 15 carrying the movable or rotatable member 20 extending through the hole 11 in the stator member 10. In this way, the stator member 10 is mounted concentrically with the axis of rotation of the rotatable member 20. A constant frequency sinusoidal effectively rotating electric field of very low energy is established on the circular array 12 of stator electrodes 13. The electrodes 13 can be etched onto the stator member 10 and interconnected using well-known printed circuit technology. The speed of rotation of the electric field preferably is chosen to be considerably greater than the maximum rotational speed of the rotatable member 20 and is maintained at precisely constant value as set by the excitation frequency. For example the field may rotate at greater than three, say at about seven times the maximum rotational speed of the rotatable member 20.

The rotor member 21 shown in FIG. 3 can be directly mounted onto the rotatable shaft 15 of the apparatus. The rotor member 21 is arranged to move in the rotating electric field generated at the stator member 10 and has an array of electrically interconnected sensor electrodes 22 for picking up a useful signal from the stator member 10. In this way when the rotor member 21 is stationary it picks up a signal which is constant in amplitude and frequency irrespective of its angular position with respect to the stator member 10, but whose phase relative to the excitation signal varies according to the angular position of the rotor member 21.

As the shaft 15 through the rotor member 21 rotates carrying with it the rotor member 21 and sensor electrodes 22, the signal picked up by the sensor electrodes 22 changes phase continuously with respect to the stator excitation in a direction determined by the direction of relative rotation. This continuously shifting phase in effect constitutes a change in frequency from that used to excite and generate the stator field. The signal from the rotor 21 can be coupled back to the stator 10 either by a sliding contact or preferably by a purely capacitive, non-contacting "slip-disc" 24 which is also etched onto the rotor member 21.

Referring in more detail to FIGS. 1 to 3, the stator member 10 includes forty eight source electrodes 13 as closely spaced as possible and all excited by equal amplitude synchronous sinusoidal a.c. signals, each signal lagging 90 degrees in phase to its nearest neighbour in one direction. The full field is therefore established by producing four equal amplitude sinusoidal voltage signals, each lagging 90 degrees in phase to its previous signal, and connected to successive electrodes 13. Every fourth electrode 13 is connected together by conductors 16 on the back of the stator 10 (see FIG. 2) making four interconnected series of twelve electrodes (13a, 13b, etc.) in each series so that the pattern of four electrodes in a row with 90 degrees of electrical phase shift between the signals on successive electrodes 13a, 13b is repeated continuously around the electrode track.

The apparent rotation of the stator field is itself rather imperfect, but the rotor member electrodes 22 are so shaped that as the rotor member 21 is moved in relation to the stator member 10, the output signal for the rotor member 21 will undergo a continuous change of phase in one direction, and vice versa. This continuous shift of phase constitutes a change in frequency from the excitation signal.

An output phase shift of one full cycle would occur for a member rotation across any four consecutive stationary electrodes 13.

The use of twelve sensor electrodes 22 on the rotor member 21 enhances the amplitude of the signal relative to use of a single sensor electrode and also small random errors in electrode positioning are masked. The twelve sensor electrodes 22 are all connected to the conductive disc 24 from which the signal can be picked up by a sliding contact or by a capacitive coupling back to conductive disc 17 on the stator 10. Conductive disc 17 is shielded against direct interference from electrodes 13 by grounded annulus 18.

The output signal from the rotor member 21 is generally a sinusoid in phase with any stator electrode 13 which its sensor electrodes 22 are exactly opposite. The output phase should be halfway between the phase of two consecutive electrodes 13a, 13b when the rotor member sensor electrode 22 is physically halfway between them. In intermediate positions there may be some non-linear relationship between physical angle and output phase angle, but there will be a total of twelve complete cycles of phase shift between the stator excitation signal and the rotor output for one complete rotation of the rotor member 21.

To maximise response linearity, the stator electrodes 13 should have the smallest possible gaps between them and they should fully overlap the rotor sensor electrodes 22 in the radial direction on both sides. Also it has been determined that each rotor electrode 22 preferably spans precisely two adjacent stator electrodes 13, start at a point at one end, rise smoothly to a maximum width at the centre and taper away to a point at the other end, the shape being symmetrical about the centre. This will be seen in FIG. 3 where the sensor electrodes 22 have this shape.

The excitation voltage for the stator electrodes 13 can be generated by signal generating means 30 generally as shown in FIG. 4. The four phase configuration can be obtained from a signal transistor class C oscillator 31 giving two outputs inherently 180 degrees out of phase but equal in amplitude. From each of these lines 32, 33, C-R phase shifting networks 34 can be used to give a phase lead of 45 degrees and a phase lag of 45 degrees, each having an amplitude attenuation of 0.707. In this way four lines 35-38 with 90 degrees of progressive phase shift at an amplitude of nominally 0.7 times the nominal R.M.S. output of the primary exciting voltage source can be obtained. The capacitors used in shifting networks 34 can be chosen to effectively swamp the capacitance of the stator electrodes 13 to each other, to the rotor 21, and to earthed shielding zones.

The use to be made of the output signals from the rotor member 21 can determine characteristics required for further processing of the signal. For example in the case where the sensor is to be used in association with a driven, steerable wheel of a powered wheelchair one requirement for the speed sensor is for a very precise sensor to provide feedback of achieved speed for very tight closed loop speed control of the main drive. Another requirement is for a very fast acting, but not necessarily very precise general indication of the speed of the steering motor in order to provide velocity feedback to assist with stabilization of the steering positioning servo. The same type of stator and rotor members 10, 21 and excitation can be used for both of these requirements but different types of processing circuitry are needed to decode the variable frequency signal provided by the rotor member.

Figure 5:
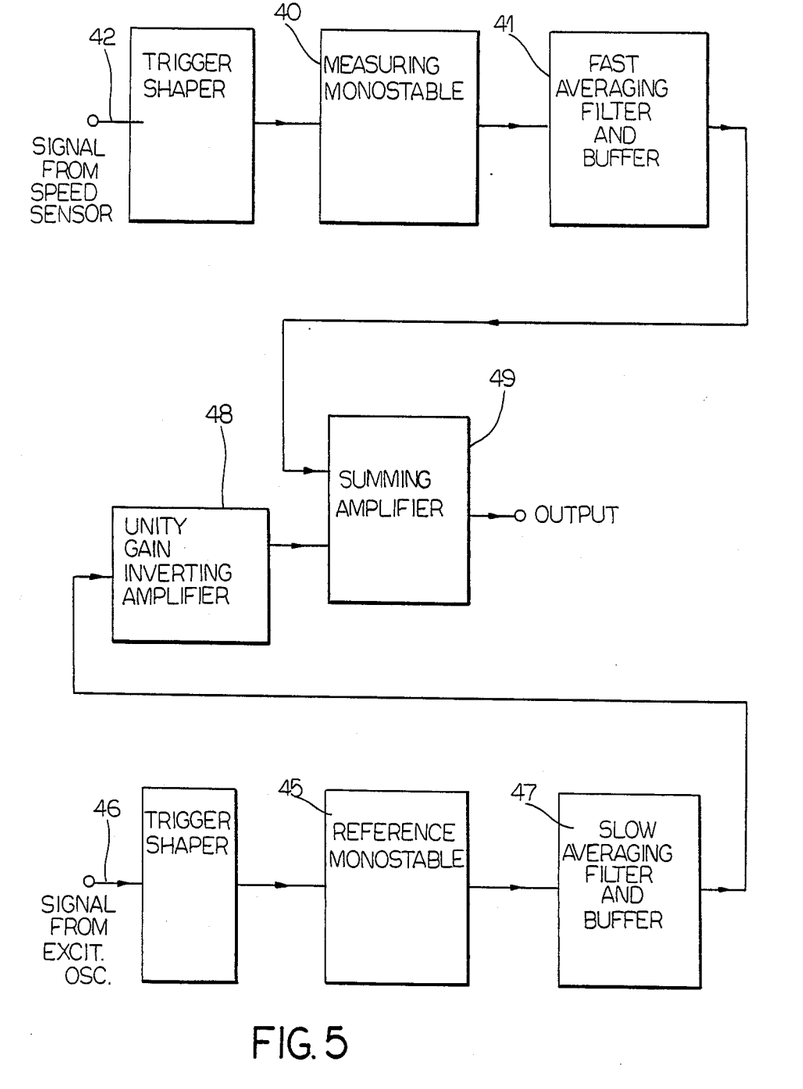
FIG. 5 is a functional block circuit diagram of a precise speed decoding circuit.

In particular referring to FIG. 5 there is shown a block diagram of a precise speed decoding circuit. In this circuit a fixed duration mono-stable pulse generator 40, or measuring mono-stable, is triggered once per cycle of the incoming variable frequency signal 42 and the resulting pulse train is fed to a buffered fast averaging filter 41. The output of this filter and buffer 41 has a certain d.c. standing value subject to minor variations in supply rail voltages, the precise frequency of the excitation oscillator, the precise duration of the pulse form the measuring mono-stable 40 and leakage in the filter buffer 41. The standing value must be subtracted very precisely in order to obtain a definitive sped indication as required for good control near zero speed.

The effect of the supply voltages and minor shifts in oscillator frequency can be completely offset in principle by using an identical mono-stable pulse generator, the "reference non-stable" 45, which is triggered directly from the excitation oscillator 46. The resulting pulse train is fed to an averaging filter 47 in which all sources of drift are identical to those of the measuring system but in which the time constant of the filter elements is longer that in the measuring system 40, 41. This voltage is subtracted from the output voltage of the measuring mono-stable 40 and the averaging filter 41 by means of inverter 48 and summer 49.

Since this reference voltage output of mono-stable 45 is not part of the direct speed measuring system, it is possible to use a much longer time constant in the filtering 47 to ensure that the residual ripple will not add significantly to the inherent residual ripple from the measuring mono-stable 40, filter and buffer 41.

The output of the summing amplifier 49 is a d.c. signal of zero volts at zero speed, a negative voltage at forward speeds and a positive voltage at reverse speeds, with the output voltage precisely linearly related to the motor speed over the entire range.

Figure 6A:
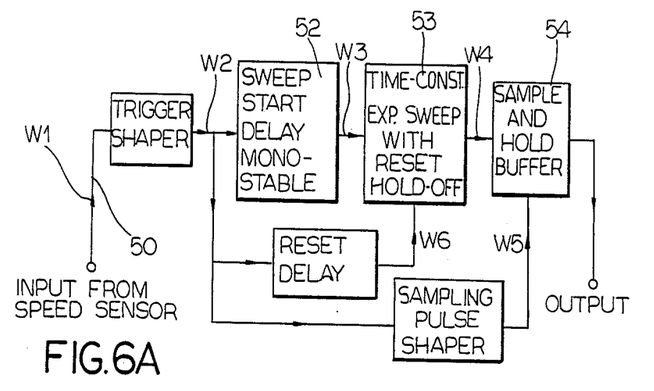
FIG. 6a is a block diagram and FIG. 6b is a waveform diagram for a rapid response speed decoding circuit.
Figure 6B:
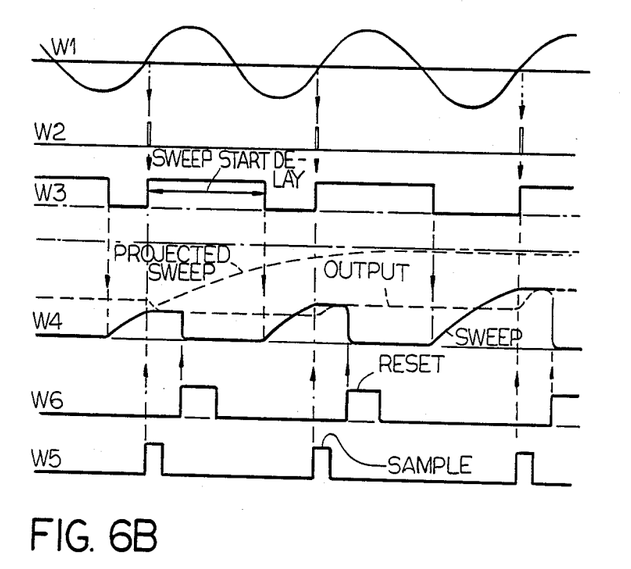

In FIG. 6a there is a rapid response speed decoding circuit such as for servo stabilisation in steering control. The speed is decoded from the frequency of the output signal 50 of the rotor member 21 with the minimum possible delay. The circuit enables the speed to be know cycle by cycle of the sensor output. The residual noise and minor short term phase instabilities which are completely masked in the FIG. 5 precision averaging system cannot be eliminated from FIG. 6 system but their influence can be sufficiently small as to impose no serious limits on the effectiveness of the servo damping output signal obtained. In FIG. 6b showing the waveforms, the speed changes are exaggerated for clarity.

The circuit basically measures the period of each cycle of input signal, and converts this to a d.c. voltage which is held in a sample-and-hold buffer 54 whose output is updated at the end of every cycle.

For good servo system damping it is desirable that the output be linearly related to motor speed. As motor speed is linearly related to frequency, the decoder output should be linearly related to frequency.

Period and frequency are related inversely, therefore it is desirable to measure the period on a reciprocal "T" scale. No great accuracy is needed because the ratio of maximum period to minimum period is near unity.

By a succession of simple calculations, it was found that an easy to generate exponential decay waveform of suitable time constant gives usable output levels relative to the initial value after appropriate time periods.

A great increase in the output from the proposed exponential waveform is obtainable by delaying the start of it by a value approaching the minimum period. The ratio of the increments would remain unchanged because of the properties of the exponential function.

The exponential function (called the sweep in this discussion), is started at say −5 volts and arranged to asymptote toward say +5 volts. The starting delay is adjusted to bring the positive going peak value of the sweep to 0 volts for a certain known period when the motor is stationary. This results in the sweep reaching a positive going peak value of say about −2 volts for a shorter known period with the motor at maximum forward speed, and say about +2 volts for a longer period with the motor at maximum reverse speed.

The sweep starting delay 52 is triggered at the instant of the shaped input tripper pulse W2. At an independently determined lesser delay, the sweep is reset to −5 volts.

At the end of the sweep delay (waveform W3), the sweep output W4 starts to rise from −5 volts toward +5 volts. At the instant of the next input trigger W2 i.e. at the exact end of the current input cycle, the sweep is arrested and held.

The output of the sample-and-hold buffer 54 is then set to this value in the next few microseconds. A short time later in the cycle the sweep 53 is reset to −5 volts ready to repeat the above operational cycle at the exact instant of the succeeding input trigger pulse W2.

The output of the buffer 54 remains at the peak voltage of the sweep W4 for the preceding cycle until it is set to the peak sweep voltage for the just completed cycle. It therefore continually represents the duration of the just-completed cycle, on a scale which is somewhat linearised for frequency.

The output is zero when the motor speed is zero. It becomes negative as the speed increases on the forward direction at a known rate and becomes positive at a similar rate as the speed increases in the reverse direction.

The invention as described and illustrated so far provides as the output of the rotor member 21 a robust sinusoidal signal at low source impedance. The frequency of this signal is greater than the excitation frequency when the motor rotates in the opposite direction to the rotating field at the stator member 10, and vice versa. The primary output signal therefore is in terms of frequency which enables absolute calibration to extremely high orders of accuracy if need be, even though the signal would normally be converted to a d.c. signal for use in an automatic control system. It has been possible using this invention to close a speed control loop in a wheelchair so tightly that full correction can be applied to the drive motor for a speed error of less than 0.2 percent of the maximum speed while maintaining a perfectly stable control system.

So far the invention has been described in detail in relation to the speed sensing. However, it will be appreciated that acceleration sensing could readily be provided by measuring the rate of change of the frequency of the rotor output signal.

Also it is possible to utilise the present invention to determine angular position of the rotor member 21 relative to the stator member 10. For example in the case of a wheelchair having a motor driven steerable wheel which the user operates for steering the wheelchair, a high performance positioning servo requires a high quality position feedback device. It is possible to use the principles of the present invention to provide an angular position sensor having an output which is continuous function relating sinusoidal phase with respect to the excitation oscillator to angular position.

Figure 7:
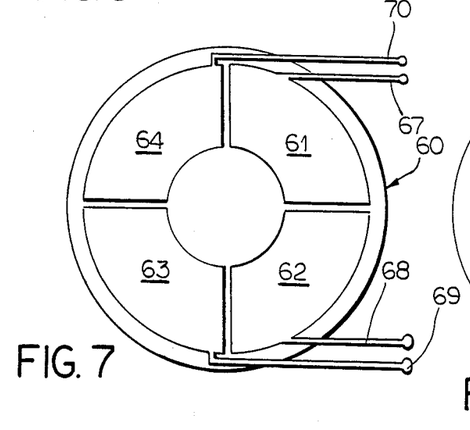
FIG. 7 is a front view of a stator member suitable for a relative angular position sensor according to a preferred embodiment of the present invention.
Figure 8:
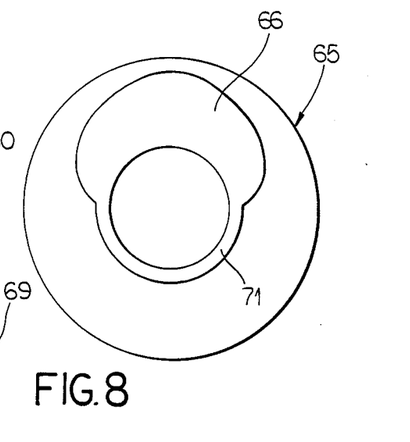
FIG. 8 is a view of a rotor member for use with the stator member of FIG. 7.

The position sensor illustrated in FIG. 7 and 8 includes a stator member 60 having four electrodes 61-64 and the rotor member 65 of the FIG. 8 has a single sensor electrode 66. The stator electrodes 61-64 are supplied with four phase excitation signals through the respective inputs 67-70 and these can be derived from the same excitation signal generating means as shown in FIG. 4. The output signal from slip ring 71 the electrode 66 of the rotor member 65 will have a 360 degree phase shift with respect to the stator excitation signal for one complete rotation of the rotor member 65. It is clear that this phase shift, for lesser degrees of relative rotational movement will be related to the extent of such relative angular movement.

The optimum shape of the rotor electrode 66 for making the output signal as linearly related to the angular displacement as possible is subject to the same criteria as the rotor electrode shape described above in relation to FIG. 3. The generally half-sinusoidal boundary shape of the sensor electrodes 22 in FIG. 3 was converted to polar co-ordinates resulting in a sensor electrode shape generally as shown in FIG. 8. This sensor electrode 66 spans two stator electrodes 61, 62, starts generally at a point at one end rises smoothly to a maximum radial width at the centre and tapers away to a point at the other end, the shape being symmetrical about the centre.

Since the rotor signal would only be subject to slow and intermittent phase changes relative to the excitation signal, in the case of wheelchair steering control, the rotor output signal can be taken out via contacting slip ring 71.

The phase shift of the rotor output signal relative to the excitation signal is substantially linearly related to physical angular position of the rotor member 65 relative to the stator member 60 for a sensor having the FIG. 7 stator configuration and FIG. 8 rotor configuration, Since the rotor member 65 can be freely positioned at any reference angle and the reference phase can be set to any angle, it is possible to position the most nearly linear 180 degree range to correspond to the desired working angle range of +/−90 degrees from straight ahead in the case of wheelchair steering control.

Figure 9:
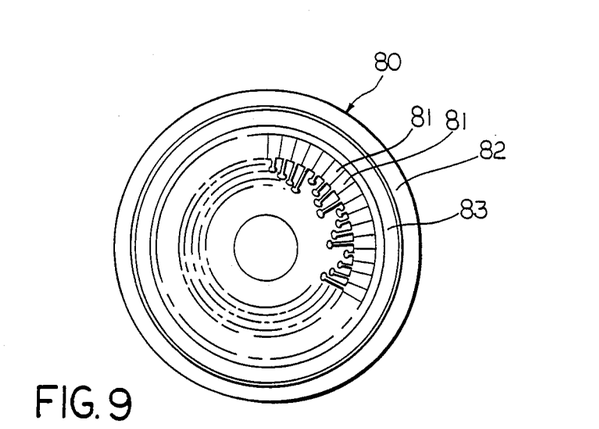
FIG. 9 is a front view of an alternative embodiment of a stator member similar to FIG. 1.
Figure 10:
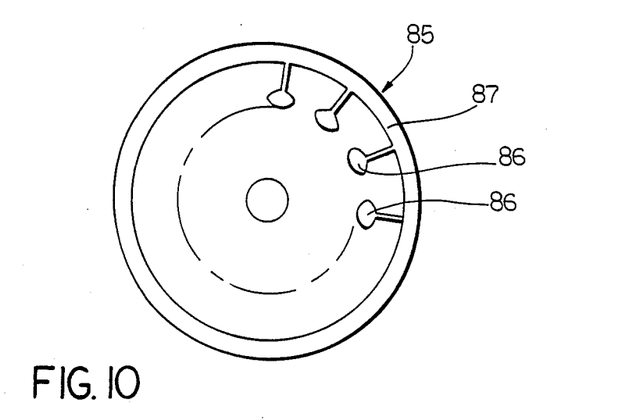
FIG. 10 is a front view of a rotor member for use with the stator member of FIG. 9.

In FIGS. 9 and 10 the stator member 80 has source electrodes 81 located radially inwardly of the annular pickup ring 82. The pickup ring 82 is separated from the electrodes 81 by earthed shielding ring 83 to minimise capacitive coupling from the shaft through the centre of the stator member 80. The rotor member 85 in FIG. 10 has electrodes 86 electrically connected to and located radial inwardly of the "slip disc" 87 which capacitively couples the sensed field signal back to the ring 82. This arrangement is believed to be less influenced by stray electric fields in the motor shaft.

It will be seen that the angular movement parameter sensor according to the preferred embodiment of the present invention as herein described and illustrated provides a signal which can easily be converted by inexpensive electronic circuitry into a d.c. voltage which can be very precisely proportional to the rotational parameter (speed or position). This d.c. voltage can be continuous through zero and have an output polarity determined by the direction of rotation. Moreover the sensor can be very light in weight and can be made very compact, can be very economical to manufacture being made by printed circuit techniques. The performance of the unit renders it suitable for use in precise automatically controlled industrial drives.

In the possible embodiments of sensors according to the present invention for sensing and indicating linear relative movement (not shown), the stationary member may be provided with field providing means in the form of a linear array of electrodes. As with the rotary movement sensor, these electrodes may be in four series of interconnected electrodes, each series being supplied with respective sinusoidal excitation signals 90 degrees out of phase with excitation signals for the adjacent electrodes. Also the sensor electrode(s) may be of half-sinusoidal boundary shape and span exactly two stationary member electrodes in the direction of relative movement between the stationary and movable members. The relative phase difference between the excitation and sensor output signals at any time instant is related to the relative positions of the two members along the line or movement, and the relative frequency of the sensor output signal is related to the relative velocity.

Finally it is to be understood that various alterations, modifications and/or additions may be made to the construction and arrangement of parts as herein described without departing from the scope of the present invention as defined in the appended claims.

What I claim is:

1. A movement parameter sensor for sensing the speed of relative movement between a stationary member defining a frame of reference and a movable member movable relative to the stationary member along a movement line, the sensor including field providing means for generating an electric field located at the stationary member, the field providing means including a pole arrangement comprising an array of four source electrode means arranged adjacent to each other along a field line generally coincident with the movement line, the field providing means further including an excitation signal generating means for generating four equal frequency sinusoidal excitation signals at 90° increments of phase, each one of the four excitation signals being applied to a respective one of the four source electrode means such that a virtually moving electric field is created at each of the source electrode means whereby the electric field effectively moves relative to the stationary member along the field line, the movement parameter sensor further including field sensing means provided at the movable member, the field sensing means comprising a plurality of sensor electrode means for sensing at any time a resultant electric field produced as a result of the excitation signals applied to more than one of the source electrode means, each sensor electrode means comprising a plurality of electrically interconnected sensor electrodes, each sensor electrode having a length in the direction of the movement line sufficient to overlap two or partially overlap three source electrodes at all times, each sensor electrode increasing in width transverse to the movement line to a maximum midway along its length, the fields densing means being operable to generate an output signal indicative of the sensed resultant electric field whereby the output signal has a frequency linearly related to the speed of relative movement between the stationary member and the movable member, the frequency of the sinusoidal excitation signals being substantially greater than any frequency with which the sensor electrodes pass the source electrodes whereby, when there is relative movement between the stationary and movable members and also when there is a zero velocity relative movement, the output signal has a non-zero frequency.

2. A movement parameter sensor as claimed in claim 1 wherein the four equal frequency sinusoidal excitation signals are sinusoidal signals of equal amplitude, each of the source electrode means being arranged closely adjacent to each other so that the resultant electric field sensed at any time by the sensor electrode means is generally sinusoidal and of substantially constant peak amplitude.

3. A movement parameter sensor as claimed in claim 2 wherein the movable member is rotatable relative to the stationary member about a rotation axis, each source electrode means comprising a plurality of source electrodes which are all substantially identical and are symmetrically arranged around the rotation axis, the number of source electrodes being a multiple of four and every fourth source electrode around the rotation axis being electrically connected to receive a respective one of the four excitation signals.

4. A movement parameter sensor as claimed in claim 3 wherein the sensor electrode means comprises a plurality of electrically interconnected sensor electrodes, the sensor electrodes being arranged symmetrically around the rotation axis at equal angles to the rotation axis, the number of sensor electrodes being equal to the number of source electrodes in each of the four source electrode means.

5. A movement parameter sensor as claimed in claim 4 wherein each sensor electrode has a length in the direction generally tangential to the direction of rotation substantially equal to the tangential length of two adjacent source electrodes.

6. A movement parameter sensor for sensing of the angular displacement between a stationary member defining a frame of reference and a rotatably movable member movable relative to the stationary member along a movement line around a rotation axis, the sensor including field providing means for generating an electric field located at the stationary member, the field providing means including a pole arrangement comprising an array of four source electrode means arranged adjacent to each other along a field line generally coincident with the movement line, the field providing means including a pole arrangement comprising an array of four source electrode means arranged adjacent to each other along a field line generally coincident with the movement line, the field providing means further including an excitation signal generating means for generating four equal frequency sinusoidal excitation signals at 90° increments of phase, each one of the four excitation signals being applied to a respective one of the four source electrode means such that a virtually moving electric field is created at the source electrode means whereby the electric field effectively moves relative to the stationary member along the field line, each of the four source electrode means comprising a single planar source electrode, the four planar source electrodes being arranged around the rotation axis and each source electrode subtending substantially 90° of arc relative to the rotation axis but being electrically insulated from each adjacent source electrode, the movement parameter sensor further including field sensing means provided at the movable member, the field sensing means comprising sensor electrode means for sensing at any time a resultant electric field produced as a result of the excitation signals applied to more than one of the source electrode means, the sensor electrode means comprising a planar sensor electrode subtending an arc of greater than 90° relative to the rotation axis so as to thereby always overlap at least two source electrodes, whereby the phase of the resultant electric field sensed by the sensor electrode relative to any one of the excitation signals shifts by 360° for one complete revolution of the movable member relative to the stationary member, and whereby the phase at any time uniquely relates to the relative angular position of the movable member about said rotation axis, the sensor electrode increasing in width transverse to the movement line to a maximum midway along its length in the circumferential direction, the field sensing means being operable to generate an output signal indicative of the sensed resultant electric field whereby the output signal has a phase shift relative to the excitation signals linearly related to the angular displacement between the stationary member and the movable member.

7. A movement parameter sensor as claimed in claim 6 wherein the sensor electrode subtends an arc of substantially 180 degrees at the rotation axis.

8. A movement parameter sensor as claimed in claim 1, wherein each said sensor electrode increases in width from a point at one end rising smoothly to its said maximum midway along its length and tapers to a point at the other end with its shape being symmetrical about its maximum width midway along its length.

9. A movement parameter sensor as claimed in claim 6 wherein each said sensor electrode increases in width from a point at one end rising smoothly to its said maximum midway along its length and tapers to a point at the other end with its shape being symmetrical about its maximum width midway along its length.

* * * * *